UNITED STATES PATENT OFFICE.

ROBERT A. MARR, OF BLACKSBURG, VIRGINIA.

PRESERVED WOOD AND PROCESS OF MAKING SAME.

1,023,784. Specification of Letters Patent. Patented Apr. 16, 1912.

No Drawing. Original application filed February 4, 1910, Serial No. 541,964. Divided and this application filed April 29, 1911. Serial No. 624,220.

*To all whom it may concern:*

Be it known that I, ROBERT A. MARR, a citizen of the United States, residing at Blacksburg, county of Montgomery, State of Virginia, have invented certain new and useful Improvements in Preserved Wood and Processes of Making Same, of which the following is a full, clear, and exact description.

My invention relates to the preservation of cut timber generally, for structural and other uses in the arts and trades. It is applicable to green timber as well as to seasoned timber, and to both coniferous and broad-leaved varieties.

It has for its object the treatment of such timbers, not only to preserve them from natural decay due to moisture and moist-heat, but against decay due to the known effect of bacteria and fungi, the spores of which enter the pores and ducts of the timber and destroy the wood tissues.

A further object of the invention, is the preservation of the timber against the destructive effect of boring insects, distinctive from bacteria and fungi, which as well known, enter the timber through self-bored radial passages, and effect its destruction, more or less complete, by a boring and a biting action on its constituent tubes and cells and its combining and binding structural tissues. And a final object of the invention, which results from the treatment hereinafter described, is the production of preserved timber which has increased strength and resiliency and improved insulation, which is impermeable as well to exterior moisture as to the destructive living organisms hereinabove referred to.

To these ends my invention comprises as well the method or process hereinafter described, as the product of such process in either or both of its identifying steps.

The basic principle of the process consists in isolating and encysting the pores, cells, tracheids and ducts of the timber, destroying any bacterial spores therein, and in closing such pores, cells and ducts to any further subsistence of destructive spores; this result being effected by subjecting the timber, in a suitable container, to the simultaneous or combined effect of a hydrocarbon of the naphthalene series, and a hydrocarbon of the paraffin series of petroleum distillate; both being applied in liquid form at a temperature varying from 186° F. to somewhat less than 212° F.; the function of the naphthalene constituent, which is volatile, is to open the pores, cells and ducts of the timber, drive out the contained moisture therein, and create or increase the capillary attraction for the last-named constituent of the bath; in other words the volatile constituent of the bath puts the cellular tissue of the timber into the most suitable condition to receive, and in a sense operates as a carrier for the paraffin constituent and enables it to penetrate substantially throughout the cellular tissue of the wood, encysting substantially every pore, cell and ducts which are otherwise impenetrable by a preserving film.

I will now describe in detail a practical application of the invention illustrative of its principle.

The log of cut timber, preferably with its bark removed, is immersed, without any previous preparation and at atmospheric temperature to the bath hereinafter described, the liquid constituents of which are sufficient in quantity to fully immerse the log. The container to be employed is a tank adapted to be heated, either by externally applied means or by hot coils within it, and in this tank is made up a bath composed, in part, of liquid paraffin, which may be prepared from solid cakes of commercial paraffin, melted in the tank, by the heat applied as aforesaid, care being taken not to raise the temperature above 212° F. and preferably not much over 180° F., and to keep it within that range, as a cooking, in any sense, of the wood, is not desired and is to be avoided; and to this melted paraffin, when the timber is ready to be immersed therein, is added five to ten per cent. by weight, relatively, of melted naphthalene, for which purpose the commercial crystallized cakes may be used and allowed to melt in the hot paraffin liquid. In this bath, so constituted, the log is allowed to remain immersed for a period of from one to four hours, depending upon the diameter of the log and the variety of the timber; for example, I found that in treating a red oak log of twelve inches length and eight inches mean diameter, an exposure of nearly four hours was desirable, to produce the most complete results, especially if a slow cooling, in the bath, the temperature being allowed to very materially fall, is employed, rather than removing the log from the high temperature bath immediately after treatment and allowing it to cool in the external atmosphere. The action, as observed, of these combined constituents of the bath, is apparently to first expel the air, sap and other moisture from the pores, cells and ducts constituting the tissue of the timber, softening them somewhat, and to substitute therefor, by a process of absorption apparently, a film of paraffin, as noted by marked gradual decrease in the level of the liquid in the container and by an examination thereof after treatment of the log; while the log so treated will, on sectioning, show, under the microscope, a very thin film of paraffin over the exterior of the log and also filling the pores, ducts and cells of its tissue, such film being insoluble in water and organic acids, and making the log impermeable to the entrance, formation or growth of bacterial spores, as well as substantially waterproof.

Any kind or variety of cut timber will respond to the treatment described; it is, of course, preferably deprived of its bark before treatment, and it may be either in a green state or in seasoned condition and, although the time occupied in the treatment of any given specimen will vary somewhat for that reason, as also upon its diameter, the variety will also affect the length of time of treatment; oak and chestnut timber, for example, being more slowly responsive to the treatment than woods of coniferous variety.

My present invention is a modification of the process described and claimed in my previous and pending application Serial No. 541,964, of which this present application is a division.

Having thus described my invention, I claim as new and desire to secure by Letters Patent:—

1. The process of treating cut timber to preserve it, which consists in impregnating the pores, cells and ducts of its tissue by subjecting the timber, in a suitable container, to the action of a mixture consisting of melted naphthalene and paraffin maintained in a melted condition at a temperature of less than 212 degrees F.

2. The process of treating cut timber to preserve it, which consists in impregnating the pores, cells and ducts of its tissue by subjecting the timber in a suitable container to the action of a mixture consisting of melted naphthalene and paraffin maintained in a melted condition at a temperature of less than 212 degrees F., and then allowing the bath to gradually cool, but not to the point of solidification, before removal of the timber treated.

3. The process of treating cut timber to preserve it, which consists in encysting the pores, cells and ducts of its tissue, with a film of paraffin and naphthalene applied thereto by saturation, in a melted condition, followed by slow cooling of the timber treated.

4. The product of the process described which is cut timber, the pores, cells and tissue ducts of which are encysted with a mixture of naphthalene and paraffin.

In testimony whereof, I have hereunto affixed my signature this 17th day of April A. D. 1911.

ROBERT A. MARR.

Witnesses:
Jno. A. Anderson,
Paul A. Tanner.